United States Patent [19]

Fish

[11] Patent Number: 5,537,326

[45] Date of Patent: Jul. 16, 1996

[54] SYSTEM FOR MANUFACTURING PARTS FOR A FUNCTIONAL DEVICE SUCH AS A CYCLONE

[76] Inventor: Randall C. Fish, 3069 Bell Rd., White Pine, Tenn. 37890

[21] Appl. No.: 304,578

[22] Filed: Sep. 12, 1994

[51] Int. Cl.$^6$ .................................................. G06F 19/00
[52] U.S. Cl. ................................... 364/474.24; 364/512
[58] Field of Search .......................... 364/474.24, 468, 364/474.25, 512, 474.22, 474.23, 191–193; 406/173; 210/512.1, 512.2; 395/914, 921, 923

[56] References Cited

U.S. PATENT DOCUMENTS

| | | |
|---|---|---|
| 3,413,776 | 12/1968 | Vytlacil . |
| 4,551,810 | 11/1985 | Levine ................................ 364/474.24 |
| 4,554,635 | 11/1985 | Levine ................................ 364/191 |
| 4,847,778 | 7/1989 | Daley ................................. 364/474.22 |
| 4,998,206 | 3/1991 | Jones et al. ........................ 364/468 |
| 5,023,800 | 6/1991 | Carver et al. ..................... 364/474.34 |
| 5,043,906 | 8/1991 | Jepson ............................... 364/474.24 |
| 5,071,057 | 12/1991 | Murphy . |
| 5,071,542 | 12/1991 | Tuszko et al. . |
| 5,115,400 | 5/1992 | Watanabe et al. ................ 364/474.24 |
| 5,121,329 | 6/1992 | Crump ............................... 364/468 |
| 5,184,306 | 2/1993 | Erdman et al. .................... 364/474.24 |
| 5,197,013 | 3/1993 | Dundorf ............................ 364/474.05 |
| 5,207,805 | 5/1993 | Kalen et al. ....................... 210/512.1 |
| 5,216,616 | 6/1993 | Masters ............................. 364/474.24 |
| 5,297,054 | 3/1994 | Kienzle et al. ................... 364/474.24 |

OTHER PUBLICATIONS

Dr. Eng. Akira Ogawa, "Separation of Particles From Air and Gases," vol. I, pp. 15, 18–21, 26, 27, 87; vol. II, Chapter 1, Uniscience Series of Fine Particle Science and Technology, John Keith Beddow, Ph.D., Editor–in–Chief, CRC Press, Inc. (1984).

Wilhelm Batel, "Dust Extraction Technology—Principles—Methods—Measurement technique," English translation by R. Hardbottle, Chapter 5, Centrifugal Dust Collectors pp. 31–51, xii–xvi, 238–257, publisher Technicopy Limited, Glos, England (1976).

"Industrial Ventilation—21st Edition—A Manual of Recommended Practice," pp. 3–18, 4–4 and 4–22, American Conference of Governmental Idustrial Hygienists, Cincinnati, Ohio (1992).

Industrial Ventilation A Manual of Recommended Practice 21st Edition (1992), American Conference of Governmental Idustrial Hygienists, pp. 4–1 to 4–34.

Primary Examiner—Roy N. Envall, Jr.
Assistant Examiner—Steven R. Garland
Attorney, Agent, or Firm—Carter & Schnedler

[57] ABSTRACT

A system for manufacturing parts for a functional device such as a cyclone separator accepts user input in the form of specified performance parameters, determines an appropriate design for the functional device based on the performance parameters, and drives a computer-aided manufacturing (CAM) machine for producing the parts. In the case of a cyclone separator, the performance parameters include air flow, particulate matter type, and separation efficiency. The appropriate design includes configurations and dimensions of parts for the cyclone, and the CAM machine cuts out the parts from sheet metal stock.

6 Claims, 7 Drawing Sheets

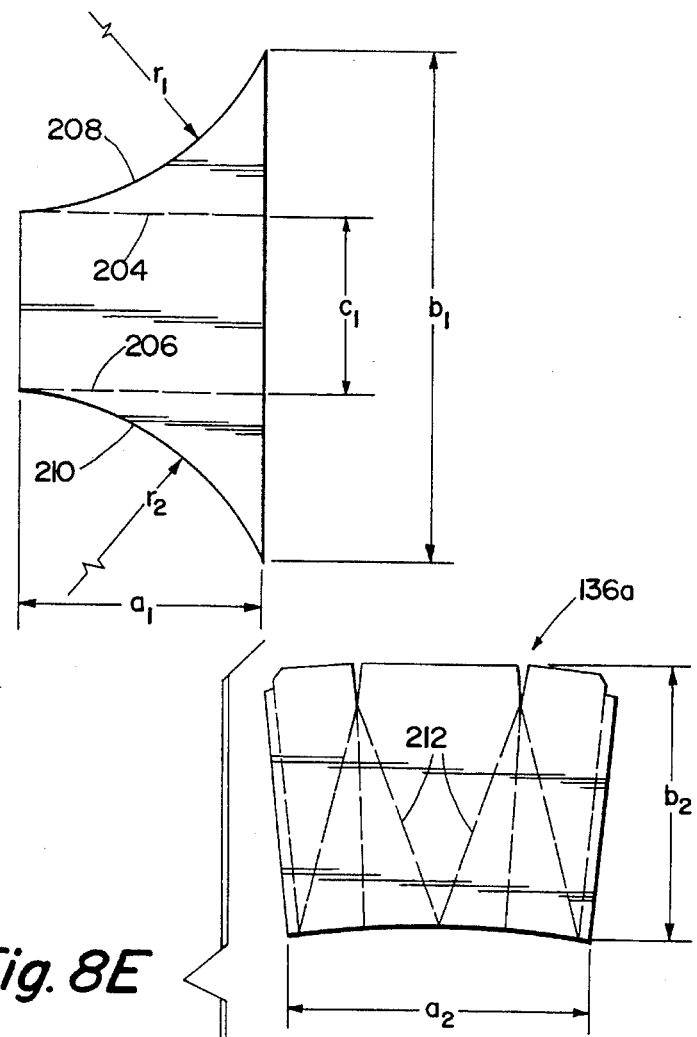
Fig. 8D
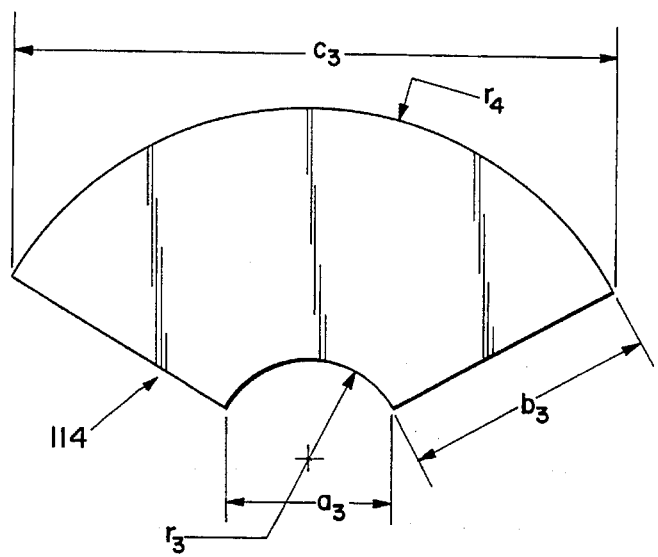
Fig. 8F    Fig. 8E
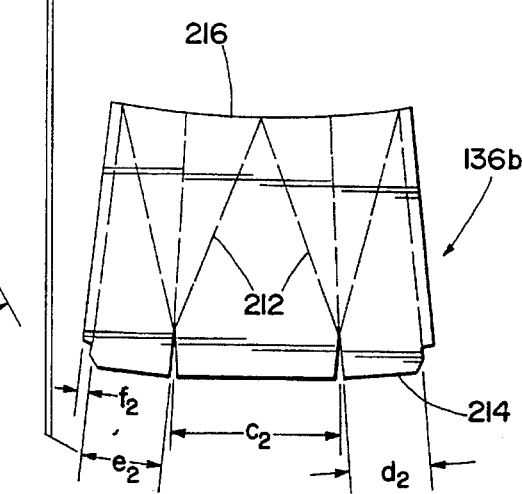

SYSTEM FOR MANUFACTURING PARTS FOR A FUNCTIONAL DEVICE SUCH AS A CYCLONE

BACKGROUND OF THE INVENTION

The invention relates generally to a system for manufacturing parts for subsequent assembly as a functional device, such as a cyclone, based on user input in the form of performance parameters.

The present invention is disclosed herein in the specific context of a cyclone separator, but the invention is not so limited. Very briefly, cyclone separators, also known as centrifugal separators, have been known since 1886 and serve to separate mixtures of particulate matter and gas by introducing the mixture at a sufficiently high velocity into the cyclone, which imparts a swirling motion such that larger, heavier solid components of the mixture move towards the interior walls of the cyclone by virtue of centrifugal force, while gas moves towards the center and is exhausted as relatively clean gas. Advantageously, cyclones employ no moving parts. The vast majority of cyclone separators are used to separate sawdust from conveying airstreams. However, cyclones are also employed for separation of a wide variety of particulate materials from conveying airstreams.

Cyclones are typically furnished and installed by mechanical contractors. In most cases, a cyclone is simply purchased as a unit from a cyclone manufacturer, and then installed. In other cases, mechanical contractors, typically having suitable equipment, manually lay out and cut out the parts for a cyclone, assuming they have a suitable design available.

Many mechanical contractors and sheet metal fabrication shops have computer-aided manufacturing (CAM) equipment, also known as numerically-controlled cutting equipment, which has the capability of directing a cutting device, such as a laser or electric arc device, in an X-Y coordinate system to cut out metal shapes that are numerically specified. The action is somewhat like a mechanical plotter, but on a relatively large scale. In some cases, rather than cutting the metal pieces directly, the equipment is employed simply to draw lines on pieces of sheet metal for subsequent manual cutting.

The prior art has extended the usefulness of CAM systems by combining or integrating CAM with computer-aided design (CAD) capability to produce CAD-CAM systems whereby a designer, with the assistance of appropriate computer software, designs specific parts. Appropriate data is then transferred directly from the CAD component of the system to the CAM component of the system for manufacturing. In general, users of such systems input configurations and dimensions of parts, which are viewable on a computer display prior to manufacture.

Such systems are disclosed in the context of sheet metal fabricating in Levine Pat. Nos. 4,551,810 and 4,554,635. The Levine patents disclose a computerized system for partially automating the design of duct work and for automatically producing patterns for the sides of conduit sections in the designed duct work. The Levine system comprehensively aids an operator in designing the duct work for an entire building, then drives a cutting machine to make the required pieces. An even more elaborate CAD-CAM system is disclosed in Jones et al Pat. No. 4,998,206.

As related prior art, Daley Pat. No. 4,847,778 discloses a computerized system for laying out patterns for individual sheet metal fittings at a job site, for subsequent manual cutting. The Daley system provides patterns for a variety of fittings of different angles and sizes.

SUMMARY OF THE INVENTION

It is an object of the invention to provide a system for manufacturing parts for subsequent assembly as a functional device, such as a cyclone separator, based on specified performance parameters.

It is another object of the invention to provide a system for manufacturing a cyclone based on specified cyclone performance parameters, particularly for use by sheet metal mechanical contractors and sheet metal fabricators who already own CAM equipment, which equipment can be employed in the combination of the subject invention.

Briefly, the system of the invention includes a user input device for inputting performance parameters of the functional device. In the case of a cyclone separator, the performance parameters are cyclone performance parameters such as air flow, particulate matter type and separation efficiency.

The system of the invention additionally includes a computer programmed to determine an appropriate design for the functional device based on the performance parameters. The appropriate design includes configurations and dimensions of parts for the functional device.

The invention additionally includes an interface to a computer-aided manufacturing machine for producing the parts, such as a computer-aided manufacturing machine for cutting out cyclone parts from sheet stock in accordance with the design configurations and dimensions. In one form, the interface is a data link, such as a conventional RS-232 hard-wired connection, or other form of data link. Alternatively, the interface can take the form of a transportable data storage device such as a computer diskette or other magnetic media, a solid-state transportable memory device, or other appropriate technology.

Thus, a distinguishing characteristic of the invention is that user input is in the form of functional parameters, and not design parameters of specific parts.

BRIEF DESCRIPTION OF THE DRAWINGS

While the novel features of the invention are set forth with particularity in the appended claims, the invention, both as to organization and content, will be better understood and appreciated, from the following detailed description, in which:

FIGS. 8A through 8F depict the parts for the cyclone example of FIGS. 5 and 6, after the parts are cut, but prior to assembly as the cyclone.

DETAILED DESCRIPTION

Figure 1:
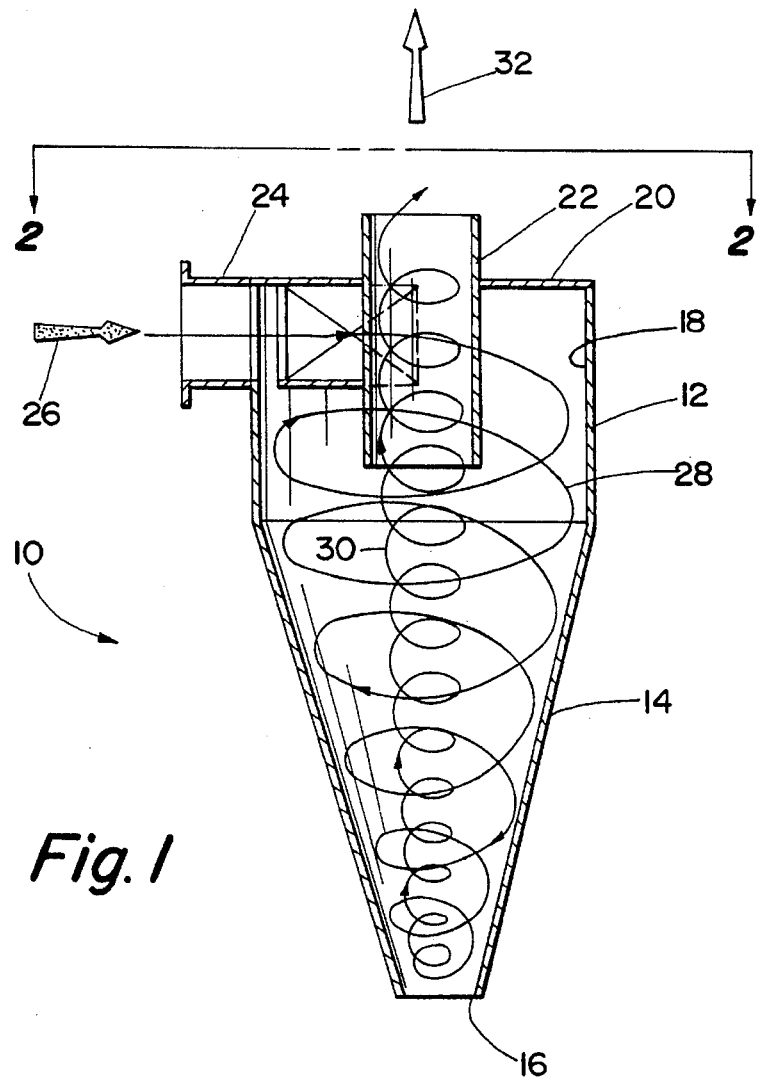
FIG. 1 is a highly schematic overview of a cyclone, generally in front elevation.
Figure 2:
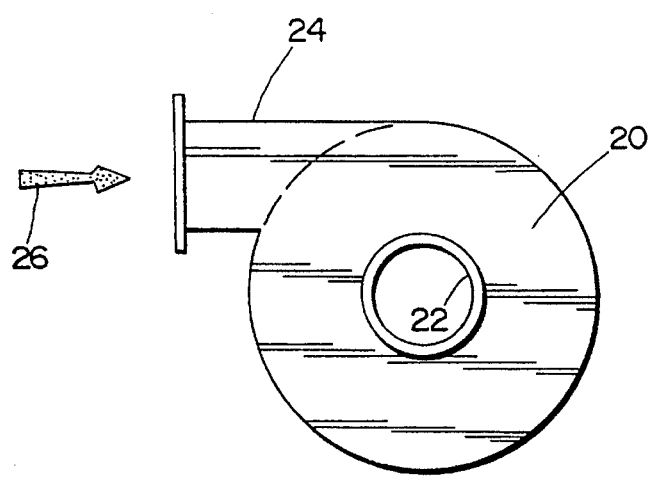
FIG. 2 is a top view taken on line 2—2 of FIG. 1.

With reference initially to FIGS. 1 and 2, very briefly a representative cyclone 10 comprises a rotationally-symmetrical dust collection chamber wherein a circulatory flow sets up centrifugal forces whereby dust is collected. The cyclone 10 more particularly comprises a hollow cylindrical upper portion, herein termed the body 12, and a hollow conical portion 14 immediately below the body portion 12. The conical portion 14 has an outlet 16 for collected particulate matter at its lower end. Depending upon the particular application, the outlet 16 may be open at all times, or may be generally closed and periodically opened either manually or automatically for removal of collected particulate matter employing a suitable valve (not shown). In some cases a rotary air lock valve (not shown) is employed.

The body 12 more particularly comprises a cylindrical sidewall 18 and a circular top 20 having a central opening through which a hollow cylindrical well 22 projects for the exit of clean gas. An inlet duct 24 is provided for tangentially introducing particulate-laden air or gas into the body 12, near the top thereof.

During operation, particulate-laden air or gas, which may be viewed as a mixture of particulate material and gas and which is represented by an arrow 26, is introduced tangentially via the inlet duct 24 into the body 12. The mixture of particulate material and gas flows circularly downwardly, generally on a path indicated by a spiral line 28, into the lower conical portion 14, and then rises along an inner path, generally represented by a spiral line 30, to enter the hollow cylindrical well 22, through which clean gas as represented by an arrow 32 exits upwardly.

As is well known, this movement pattern sets up centrifugal forces which carry dust particles to the inner surfaces of the wall comprising the sidewall 18 and conical portion 14, which serve as a removal interface. Particulate matter flows over the cyclone wall generally in a downward direction to the bottom, for ultimate removal via the particulate outlet 16.

Operation of cyclone separators has been subject to rigorous mathematical analysis. Exemplary reference sources are "Separation of Particles From Air and Gases" by Dr. Eng. Akira Ogawa, Uniscience Series on Fine Particle Science and Technology, John Keith Beddow, Ph.D., Editor-in-Chief, CRC Press, Inc. (1984); and "Dust Extraction Technology—Principles—Methods—Measurement technique" by Wilhelm Batel, particularly Chapter 5, "Centrifugal Dust Collectors," English translation by R. Hardbottle, publisher Technicopy Limited, Glos, England (1976).

Figure 3:
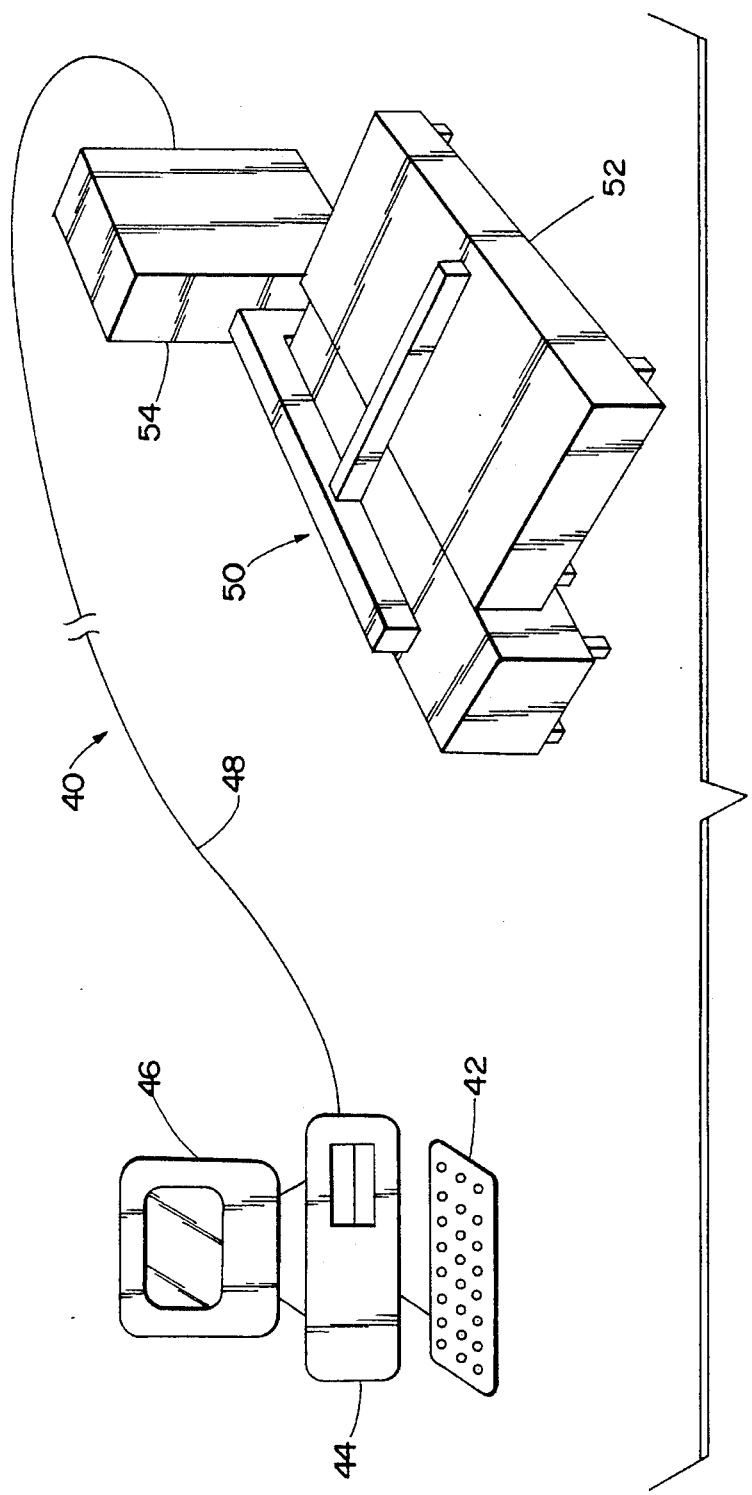
FIG. 3 is a block diagram of a system of the invention comprising a computer linked to a CAM system comprising an X-Y cutting table.

FIG. 3 depicts a system 40 in accordance with the invention comprising a user input device, in the form of a keyboard 42 associated with a computer 44 including a video monitor 46. The computer 44 is programmed to determine an appropriate cyclone design based on performance parameters which are input via the keyboard 42. The system 40 additionally includes an interface, in the representative form of an RS-232 data communications link 48, connected to a computer-aided manufacturing (CAM) machine 50 for cutting out cyclone parts from sheet stock in accordance with the design configurations and dimensions. As is described hereinbelow in greater detail with reference to the flowcharts of FIGS. 7A and 7B, the computer 44 is programmed to determine an appropriate cyclone design based on the performance parameters. The appropriate cyclone design includes configurations and dimensions of cyclone parts.

A suitable computer-aided manufacturing machine 50 is a Vulcan Model No. 7400, manufactured by the Lockformer Corporation. The CAM machine 50 includes an X-Y cutting table 52 and an appropriate electronics package 54 for driving the X-Y cutting table 52.

Figure 4:
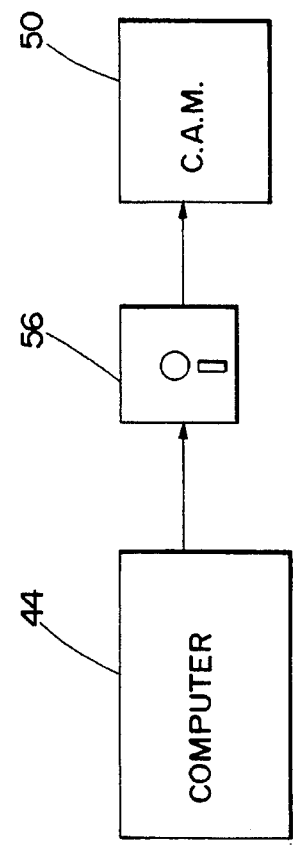
FIG. 4 depicts in block diagram form an alternative to the system configuration of FIG. 3.

With reference to FIG. 4, as an alternative to the hard-wired data link 48 of FIG. 3, the interface between the computer 44 and the computer-aided manufacturing machine 50 may comprise a transportable data storage device 56, in the illustrative form of a computer floppy diskette 56. It will be appreciated, however, that any suitable storage media may be employed, such as magnetic tape and solid state memory devices. Thus, in FIG. 4, data is written to the floppy diskette 56 by the computer 44, and the diskette 56 representative of any transportable data storage device is physically carried to the CAM machine 50.

Figure 5:
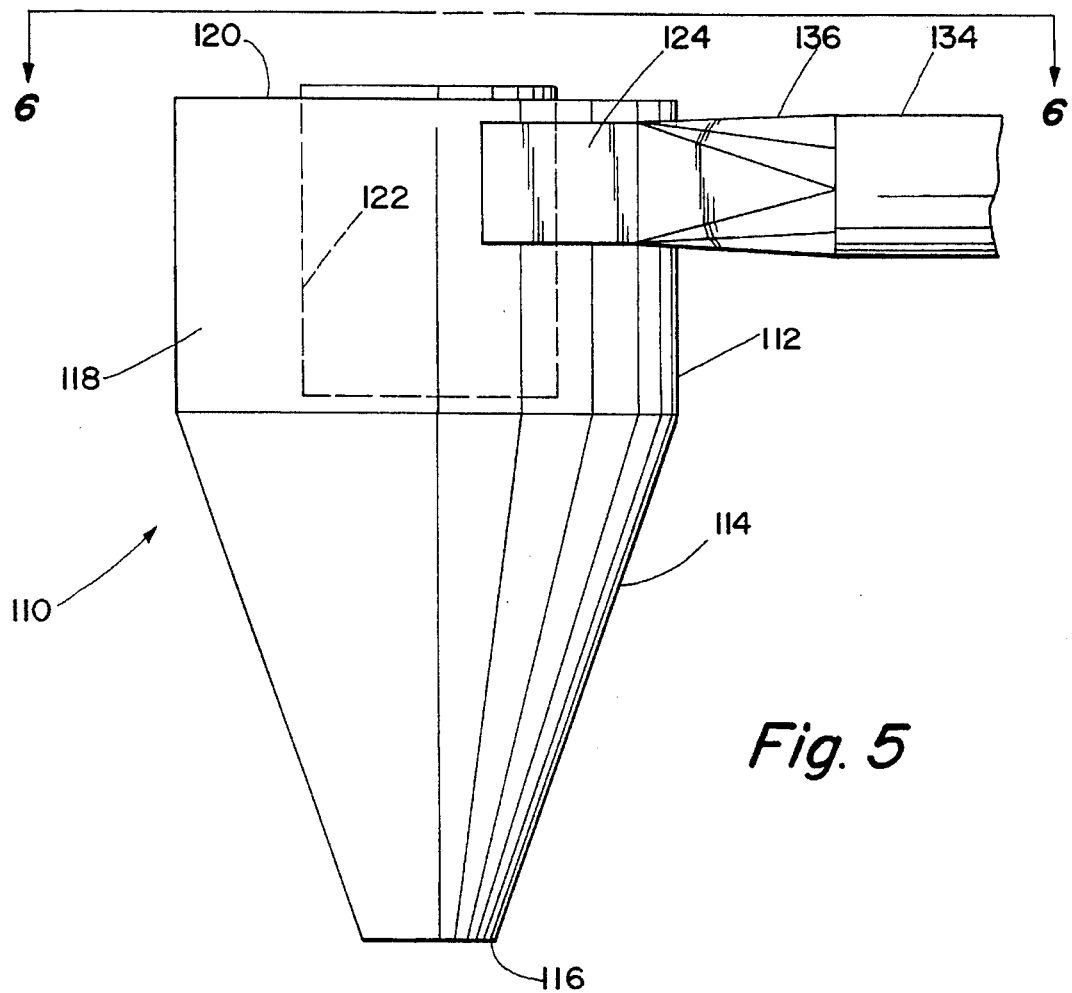
FIG. 5 is a front elevational view of a simple cyclone employed in the specific example described hereinbelow.
Figure 6:
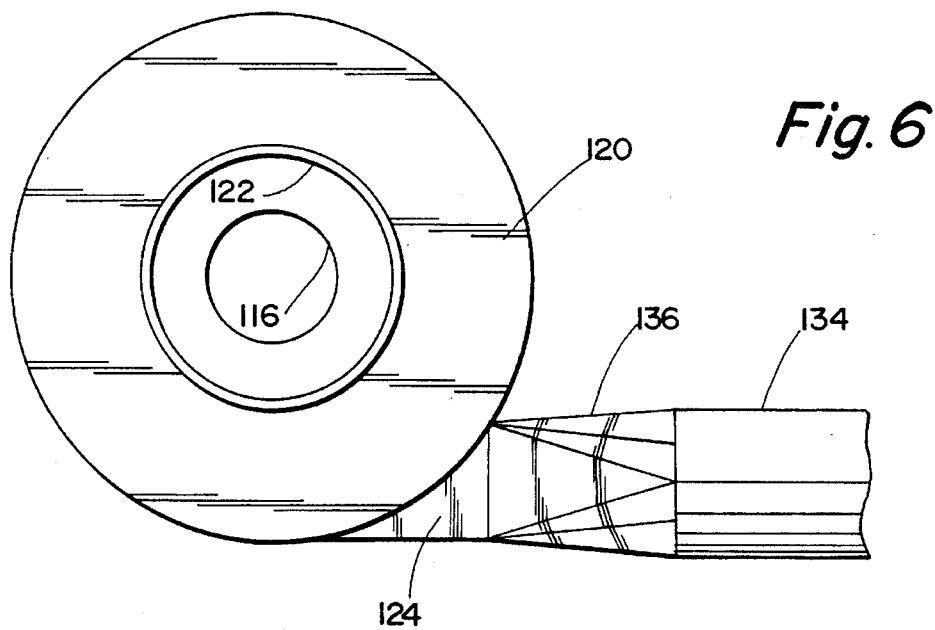
FIG. 6 is a top view of the cyclone of FIG. 5.

FIGS. 5 and 6 are front elevational and plan views of a flat top cyclone 110 used for purposes of a representative design example described hereinbelow. In general, elements of the cyclone 110 of FIGS. 5 and 6 correspond to elements of the cyclone 10 of FIGS. 1 and 2, and reference numerals increased by 100 are employed. Thus, the flat top cyclone 110 of FIGS. 5 and 5 includes a hollow cylindrical body 112 having a sidewall 118 and a top 120, a conical portion 114, a lower particulate outlet 116, and a cylindrical well 122. There is a square cross section inlet duct 124 for particulate-laden air supplied from a round duct 134 through a square-to-round transition fitting 136.

The cyclone configuration 110 of FIGS. 5 and 6 used for purposes of present example is a general purpose cyclone suitable for materials such as sawdust, wood shavings, sanding mixtures, polishing and buffing residue, and dust control applications where relatively large sized particles are encountered. A general usage cyclone is characterized by having a moderate diameter, cone length and overall height to satisfy a wide range of practical applications.

Figure 7A:
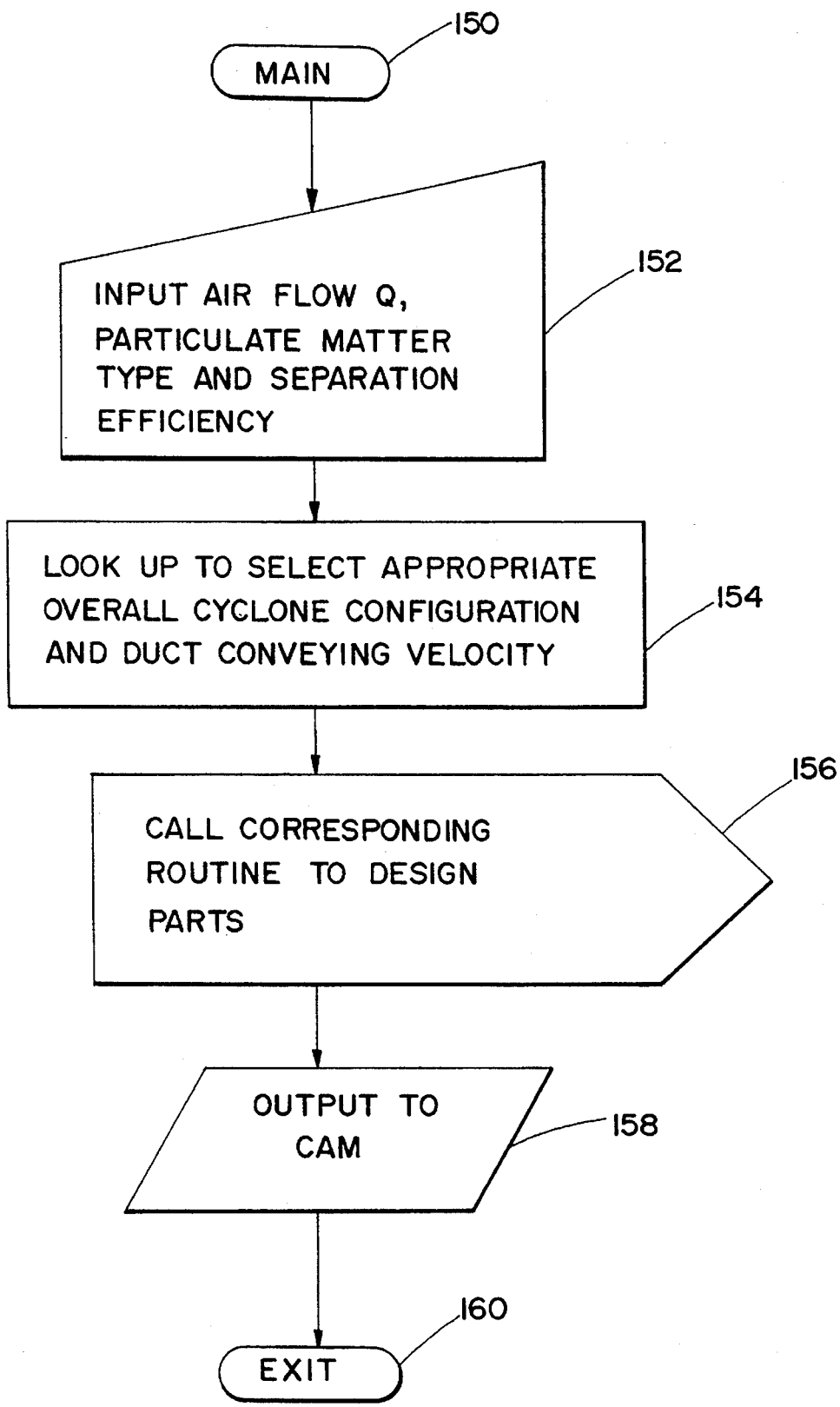
FIGS. 7A and 7B comprise a flowchart of programming within the computer of FIGS. 3 and 4.

FIG. 7A is a flowchart representative of appropriate programming running within the computer 44. FIG. 7A depicts a main routine which is entered at 150, and which in Box 152 accepts user input in the form of performance parameters for a cyclone separator. In this example, the performance parameters include airflow (also known as Q in the industry), particulate matter type, and separation efficiency.

Next, in Box 154, an appropriate overall cyclone configuration is selected, as well as the duct conveying velocity (known as V in the industry). It will be appreciated that a wide variety of cyclone configurations are known, and the present invention is not directed to the specifics of cyclone design per se.

As stated hereinabove, the cyclone configuration of FIGS. 5 and 6 has a moderate diameter, cone length and overall height, and satisfies a wide range of practical applications. On the other hand, for lighter, finer grades, the cyclone cone portion 114 is typically elongated, to provide higher collection efficiency of less bulky materials. Applications with lightweight particulate matter that is relatively fine in size generally require tall and narrow cyclone designs, with extra-tall cones and bodies. As yet another example, cyclone configurations are known which are particularly suited to handling abrasive materials with minimal damage to the cyclone.

For sawdust, which is considered a heavy dust, an appropriate duct conveying velocity V is 4500 feet per minute, such as is known from published tables such as are found in the Industrial Ventilation manual published by American Conference of Governmental Industrial Hygienists, Cincinnati, Ohio (21st Edition, 1992).

Average industrial dust has a slightly lower duct conveying velocity requirement, such as 4000 FPM. Examples of average industrial dust include grinding dust, buffing lint, wool jute dust, coffee beans, shoe dust, granite dust, silicon flour, general material handling, bread cutting, clay dust, general foundry dust, limestone dust, packaging and weighing asbestos dust in textile industries. On the other hand, heavy or moist particulate matter requires duct conveying velocities in excess of 4500 FPM. Examples include lead dust with small chips, moist cement dust, asbestos chunks from pipe cutting machines, sticky buffing lint and quick lime dust.

As another example, very fine light dust such as cotton lint, wood flour and lithe powder requires a duct conveying velocity of only 3000 FPM.

Next, in Box 156, an appropriate routine, corresponding to the particular cyclone configuration selected in Box 154, is called to actually design the parts. An exemplary design routine is described hereinbelow with reference to the flowchart of FIG. 7B. The design routine determines the dimensions of the cyclone parts for the particular configuration which is selected.

Finally, in Box 158 the program outputs the configurations and dimensions of the cyclone parts to the CAM machine 50 in an appropriate format, in a manner well known in the art. The 7A routine then exits at 160.

Figure 7B:
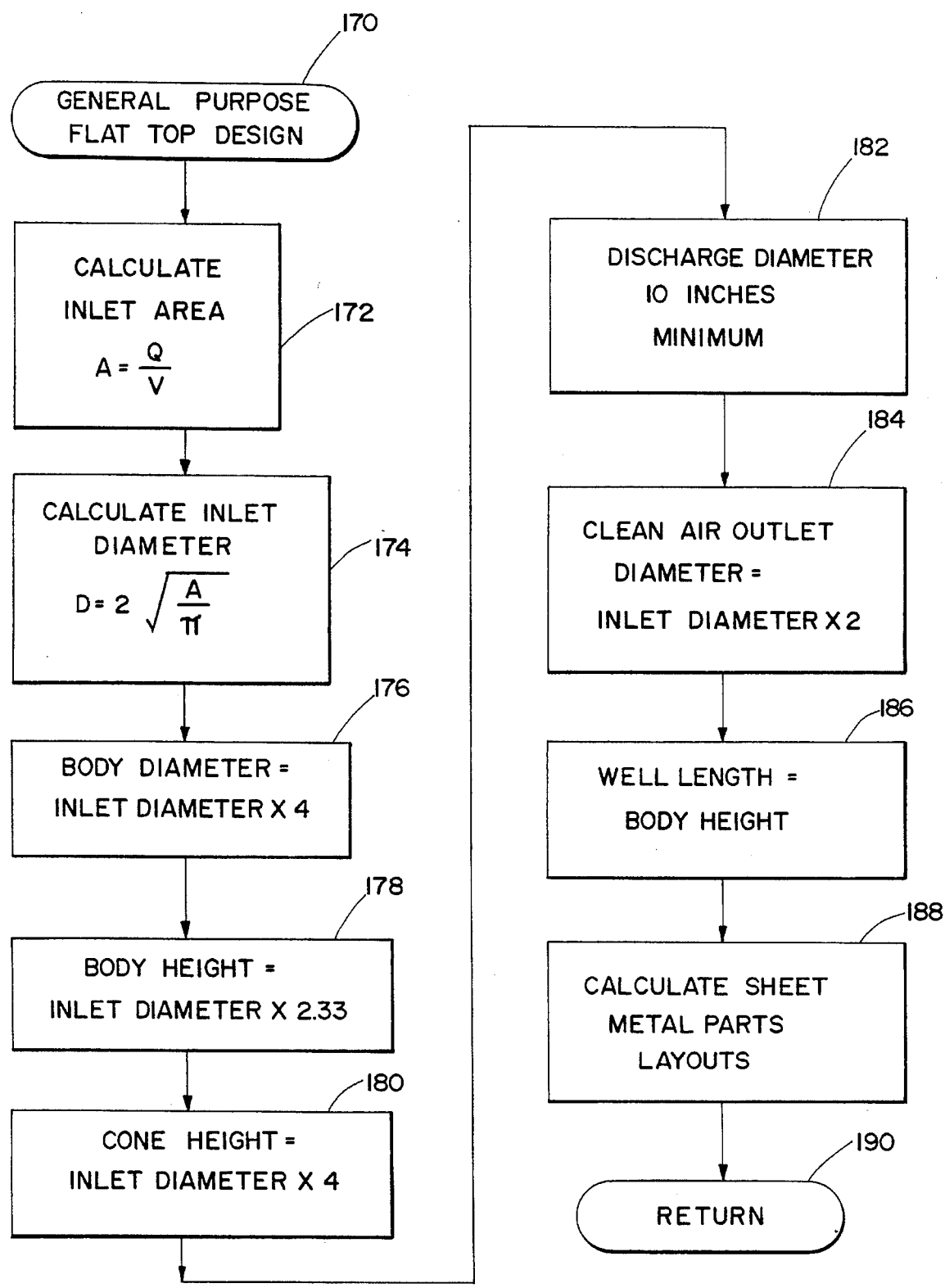

FIG. 7B is a flowchart of a representative design routine called by step 156 in FIG. 7A. It will be appreciated that the flowchart of FIG. 7B represents merely one routine out of a number of routines, each one corresponding to a particular overall cyclone configuration. Alternatively, depending upon the approach taken by an individual programmer, a single design routine may, by means of appropriate conditional statements, operate to design the parts for cyclones of a variety of configurations, again depending upon the input performance parameters.

FIG. 7B more particularly represents a general purpose flat top design routine, which is entered at Box 170.

In Box 172, the inlet area A is calculated, using the formula $$A = \frac{Q}{V},$$

where Q is in cubic feet per minute (CFM) and V is duct conveying velocity in FPM. For the example of sawdust, V is 4500 FPM. In this example, a 2000 CFM general usage cyclone is designed to collect sawdust. Thus, the inlet area is 0.4444 square feet.

Next, in Box 174 inlet diameter D is calculated, using the formula $$D = 2\sqrt{\frac{A}{\pi}},$$

which is derived from the geometric formula $A=\pi r^2$. In this example, the inlet diameter D is approximately 9 inches.

In Box 176, the diameter of the body 112 is calculated as four times the inlet diameter, or 36 inches. In Box 178, the height of the body 112 is calculated as 2.33 times the inlet diameter, which is approximately 21 inches. In Box 180, the height of the conical portion 114 is calculated, also as four times the inlet diameter, which is 36 inches in this example.

The diameter of the particulate discharge opening 116 at the bottom is determined in Box 182, somewhat arbitrarily. Generally, ten inches is considered a minimum discharge diameter, but the discharge diameter 116 is increased for larger size cyclones. Discharge diameter 116 is determined by the specific dust removal application requirements.

In Box 184, the diameter of the clean air outlet is calculated, as two times the inlet diameter, or 18 inches in this example.

In Box 186 for this particular cyclone design, the length of the well 122 is set the same as the height of the body 112 which is 21 inches.

Finally, in Box 188, the layouts and dimensions of the sheet metal parts to construct the cyclone 110 having the dimensions just calculated are in turn calculated, employing conventional geometrical relationships.

The general purpose flat top design routine of FIG. 7 then returns to the FIG. 7A main program from box 190.

Finally, to complete this example, FIGS. 8A, 8B, 8C, 8D, 8E and 8F depict the actual sheet metal parts manufactured by the system of the invention to construct the exemplary cyclone 110 of FIGS. 5 and 6.

Figure 8A:
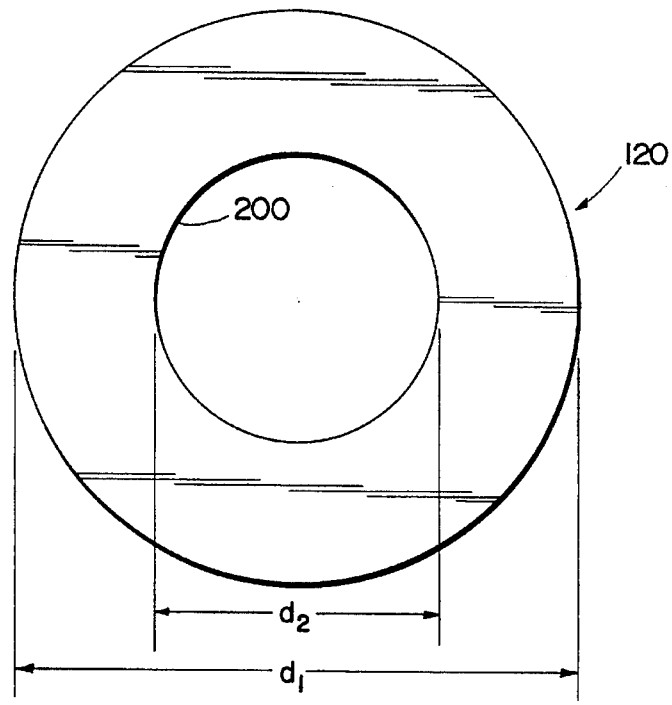

More particularly, FIG. 8A shows a piece for the top 120, comprising a circle with an outer diameter $d_1$, of 36 inches and a circular central aperture 200 having a diameter $d_2$ of 18 inches, for receiving the cylindrical well 122.

Figure 8B:
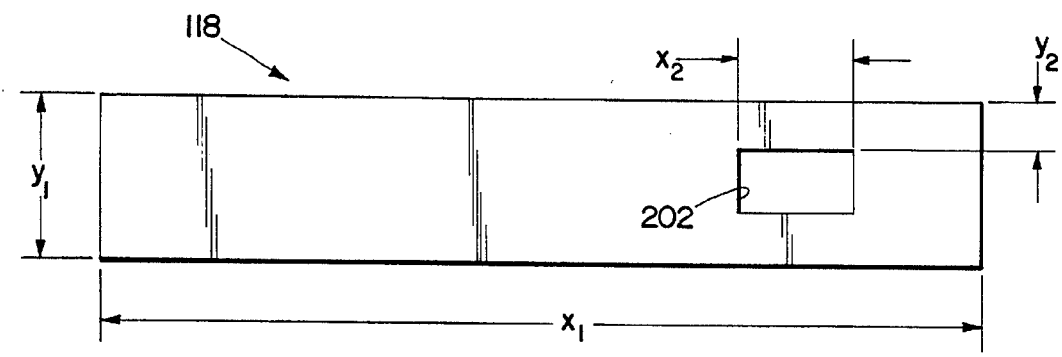

FIG. 8B shows a piece for the body sidewall 118, comprising a rectangular strip extending 9 ft. 5.1 inches in one direction ($x_1$ dimension) corresponding to the circumference of the body 112, and 21 inches in the other direction ($Y_1$ dimension) corresponding to the height of the body 112. A rectangular opening 202 is provided for the inlet duct 124, sized 15 inches ($x_2$ dimension) by 6.375 inches ($Y_2$ dimension).

Figure 8C:
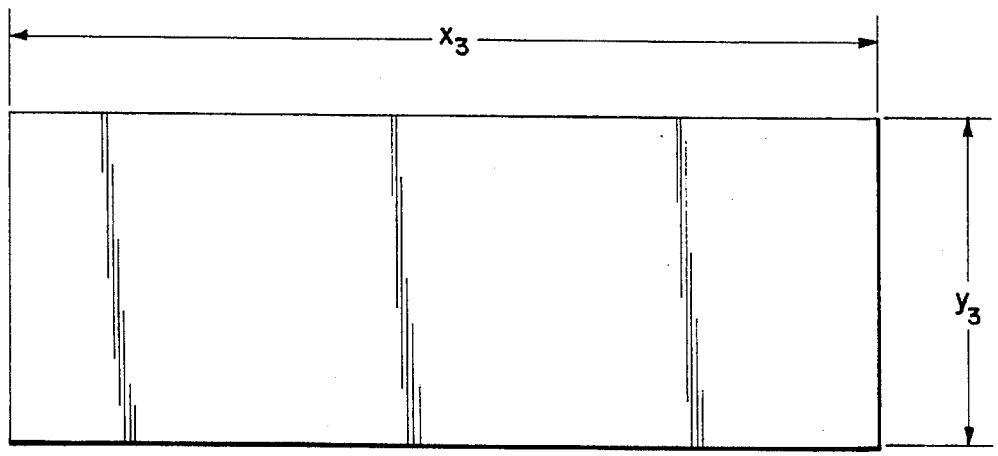

FIG. 8C shows a simple rectangular piece for forming the cylindrical well 122, having an $X_3$ dimension of 4 ft. 8.55 inches corresponding to the circumference of the well 122, and a $Y_3$ dimension of 21 inches corresponding to the height of the well 122.

FIG. 8D shows a piece for the inlet duct 124, with right angle bend lines indicted at 204 and 206. The piece 124 has dimensions $a_1$, $b_1$ and $c_1$ of 12 inches, 24.75 inches and 8.25 inches, respectively. There are two concave edges 208 and 210 which match the curvature of the body 112, with radii $r_1$, and $r_2$ both 18 inches.

FIG. 8E shows a pair of identical pieces 136a and 136b comprising the square-to-round transition fitting 136 of conventional configuration. Bend lines 212 are indicated. Indicated dimensions are as follows: $a_2$=14.38 inches; $b_2$=13.06 inches; $c_2$=8.25 inches; $d_2$=$e_2$=4.125 inches; and $f_2$=0.5 inch. Edge 214 is 6° from horizontal. Edge 216 is curved on a radius of 49 inches.

Finally, FIG. 8F shows a piece for the conical portion 114. Indicated dimensions are as follows: $a_3$=25.06 inches; $b_3$=38.73 inches; and $c_3$=7 ft., 8.82 inches. Two radii are indicated. $r_3$=14.72 inches, and $r_4$=4 ft., 5.0 inches.

Although the specific example herein is for manufacturing a cyclone separator, it will be appreciated that the invention is applicable in any situation where a user inputs functional parameters, and the equipment then proceeds to determine and make parts necessary to build the design. There are a wide variety of situations to which the general principles of the invention are applicable, such as bag or cartridge type dust collectors, gravity separators (commonly known as drop-out boxes), and wet type collectors such as packed towers and scrubbers.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A system comprising:

a user input device for inputting cyclone performance parameters;

a computer programmed to determine an appropriate cyclone separator design based on the performance parameters, the appropriate cyclone separator design including configurations and dimensions of cyclone separator parts; and an interface to a computer-aided manufacturing machine for cutting out the cyclone separator parts from sheet stock in accordance with the design configurations and dimensions.

2. A system in accordance with claim 1, wherein said user input device is for inputting cyclone performance parameters selected from the group consisting of air flow, particulate matter type and separation efficiency.

3. A system in accordance with claim 1, wherein said interface comprises a data link.

4. A system in accordance with claim 1, wherein said interface comprises transportable data storage device.

5. A system for manufacturing parts for subsequent assembly as a cyclone separator, said system comprising:

a user input device for inputting cyclone performance parameters;

a computer programmed to determine an appropriate cyclone design based on the performance parameters, the appropriate cyclone design including configurations and dimensions of cyclone parts;

a computer-aided manufacturing machine connected to the computer and operable to cut out the cyclone parts from sheet stock in accordance with the design configurations and dimensions.

6. A system in accordance with claim 5, wherein said user input device is for inputting cyclone performance parameters selected from the group consisting of air flow, particulate matter type and separation efficiency.

* * * * *